US007466807B2

(12) United States Patent
McCann et al.

(10) Patent No.: US 7,466,807 B2
(45) Date of Patent: Dec. 16, 2008

(54) METHODS, SYSTEMS AND COMPUTER PROGRAM PRODUCTS FOR OFFLOADING PREPAID STATUS QUERIES FROM A PREPAID STATUS DATABASE FOR UNLIMITED IN-NETWORK PREPAID CALLS

(75) Inventors: Thomas M. McCann, Cary, NC (US); Devesh Agarwal, Raleigh, NC (US); Chin-Chuan Chiu, Algonquin, IL (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 91 days.

(21) Appl. No.: 11/724,590

(22) Filed: Mar. 15, 2007

(65) Prior Publication Data
US 2007/0286367 A1 Dec. 13, 2007

Related U.S. Application Data

(60) Provisional application No. 60/782,673, filed on Mar. 15, 2006.

(51) Int. Cl.
*H04M 15/00* (2006.01)
*H04M 7/00* (2006.01)
*H04M 11/00* (2006.01)

(52) U.S. Cl. .............................. 379/114.2; 379/114.01; 379/221.07; 456/406

(58) Field of Classification Search ............ 379/114.01, 379/114.15, 114.2, 221.07, 221.11, 229, 379/112.05, 112.06; 455/405–408
See application file for complete search history.

(56) References Cited

U.S. PATENT DOCUMENTS 7,310,415 B1 * 12/2007 Short .......................... 379/130

2004/0184594 A1 * 9/2004 Schmechel et al. .......... 379/229
2006/0252425 A1 * 11/2006 Jiang ........................ 455/432.1
2006/0258329 A1 * 11/2006 Gruchala et al. ............. 455/405
2007/0047539 A1 * 3/2007 Agarwal et al. ............. 370/384

* cited by examiner

*Primary Examiner*—Quoc D Tran
(74) *Attorney, Agent, or Firm*—Jenkins, Wilson, Taylor & Hunt, P.A.

(57) ABSTRACT

Methods, systems, and computer program products for offloading prepaid credit status queries from prepaid credit status databases for unlimited-plan prepaid in-network calls is provided. According to one aspect, the subject matter described herein includes a method that includes intercepting, at a signaling message routing node, a prepaid status query associated with a call originated by a calling subscriber and directed to a called subscriber. The signaling node then determines whether the calling subscriber is associated with an unlimited calling plan, unlimited text messaging plan, unlimited multimedia messaging plan, or a combination of plans based on the intercepted prepaid status query. The node also determines whether the call is an in-network call based on the intercepted prepaid status query, where an in-network call includes a call between a calling subscriber and a called subscriber belonging to the same network. In response to determining that the call is an in-network call associated with a calling party associated with an unlimited calling, text messaging, or multimedia messaging plan, the signaling node generates a prepaid status response instructing the query originator to connect the call. Alternatively, in response to determining that the call is not an in-network call associated with a calling party associated with an unlimited calling, text messaging, or multimedia messaging plan, the signaling node forwards the prepaid status query to the intended destination prepaid status database.

17 Claims, 4 Drawing Sheets

METHODS, SYSTEMS AND COMPUTER PROGRAM PRODUCTS FOR OFFLOADING PREPAID STATUS QUERIES FROM A PREPAID STATUS DATABASE FOR UNLIMITED IN-NETWORK PREPAID CALLS

RELATED APPLICATIONS

The presently disclosed subject matter claims the benefit of U.S. Provisional Patent Application Ser. No. 60/782,673, filed Mar. 15, 2006; the disclosure of which is incorporated herein by reference in its entirety.

TECHNICAL FIELD

The subject matter described herein relates to query offloading. More specifically, the subject matter describes methods, systems and computer program products for offloading prepaid credit status queries from a prepaid credit status database for unlimited in-network prepaid calls.

BACKGROUND

In traditional mobile calling plans, mobile subscribers place calls to other subscribers and are billed at the end of each billing period for each call placed during that period. Calls may be billed based on a variety of factors, such as length of each call and the type of call (i.e. voice, video, text message, long-distance, local, etc). However, in recent years, mobile network operators have also offered so-called "prepaid" calling plans to mobile subscribers where subscribers pay for calls in advance of placing them by setting aside a prepaid credit amount dedicated to paying for prepaid calls. Prepaid calling plans then use this prepaid credit amount associated with each prepaid mobile subscriber to determine, before connecting each call, whether the subscriber possesses enough prepaid credit to place the call. Upon completing the call, the prepaid credit amount is typically debited. Therefore, when a call is initiated by a prepaid subscriber, a prepaid credit status database containing prepaid credit information associated with the prepaid subscriber is queried to determine whether the subscriber possesses enough prepaid credit to connect the call. Network operators typically pay a license fee for each query serviced by a prepaid status database.

In addition to the prepaid calling plans mentioned above, many network operators have begun offering so-called "unlimited" prepaid calling plans to in-network subscribers. Subscribers belonging to unlimited prepaid calling plans may place an unlimited number of calls to other subscribers if the type of call being placed is included in the plan and the call is "in-network" (i.e. both the calling subscriber and the called subscriber belong to the same network). Therefore, for all in-network calls placed by unlimited prepaid subscribers, the response to a prepaid status query always includes an instruction to proceed with connecting the call. It is thus appreciated that networks including a large number of unlimited prepaid subscribers placing in-network calls will generate a similarly large number of prepaid status queries and affirmative prepaid status query responses.

One problem associated with conventional prepaid status query systems is that an unnecessary number of prepaid status queries are sent to prepaid credit status databases for queries associated with unlimited-plan prepaid subscribers. Many prepaid status queries associated with unlimited prepaid calling plans may be unnecessary because the determination regarding whether to place the call may be made without examining information located in a prepaid credit status database. These additional unnecessary status queries increase the message traffic load in communications networks, thereby increasing the cost and complexity required to maintain service for other types of network traffic. In addition, prepaid database operators often charge license fees for queries to their data. Unnecessary queries to the prepaid databases thus result in unnecessary license fee and loss of revenue.

Accordingly, a need exists for offloading prepaid credit status queries from prepaid credit status databases related to unlimited in-network prepaid calls.

SUMMARY

According to one aspect, the subject matter described herein comprises methods, systems and computer program products for offloading prepaid credit status queries from prepaid credit status databases for unlimited-plan prepaid in-network calls. One method includes intercepting, at a signaling message routing node, a prepaid status query associated with a call originated by a calling subscriber and directed to a called subscriber. The signaling node then determines whether the calling subscriber is associated with an unlimited calling plan, unlimited text, or unlimited multimedia messaging plan, or a combination of both plans based on the intercepted prepaid status query. The node also determines whether the call is an in-network call based on the intercepted prepaid status query, where an in-network call includes a call between a calling subscriber and a called subscriber belonging to the same network. In response to determining that the call is an in-network call associated with a calling party associated with an unlimited calling, text messaging, or multimedia messaging plan, the signaling node generates a prepaid status response instructing the query originator to connect the call. Alternatively, in response to determining that the call is not an in-network call associated with a calling party associated with an unlimited calling, text messaging, or multimedia messaging plan, the prepaid status query is forwarded to a prepaid status database.

According to another aspect, a signaling message routing node for offloading prepaid status queries for in-network prepaid calls includes a communications module and a prepaid status query offload module. The communications module intercepts prepaid status queries associated with a call originated by a calling subscriber and directed to a called subscriber, and provides information contained in the query to the prepaid status query offload module. The prepaid status query offload module is configured to determine whether the calling subscriber is associated with an unlimited calling or text messaging plan, as well as whether the call is an in-network call based on the intercepted prepaid status query. In response to determining that the call is an in-network call associated with a calling party associated with an unlimited calling or text messaging plan, the prepaid status query offload module generates a prepaid status response instructing the query originator to connect the call. Alternatively, in response to determining that the call is not an in-network call associated with a calling party associated with an unlimited calling or text messaging plan, the prepaid status query offload module forwards the prepaid status query to a prepaid status database.

The subject matter described herein may be implemented using a computer program product comprising computer executable instructions embodied in a computer readable medium. Exemplary computer readable media suitable for implementing the subject matter described herein include chip memory devices, disc memory devices, application specific integrated circuits, programmable logic devices, and downloadable electrical signals. In addition, a computer program product that implements a subject matter described herein may reside on a single device or computing platform or maybe distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
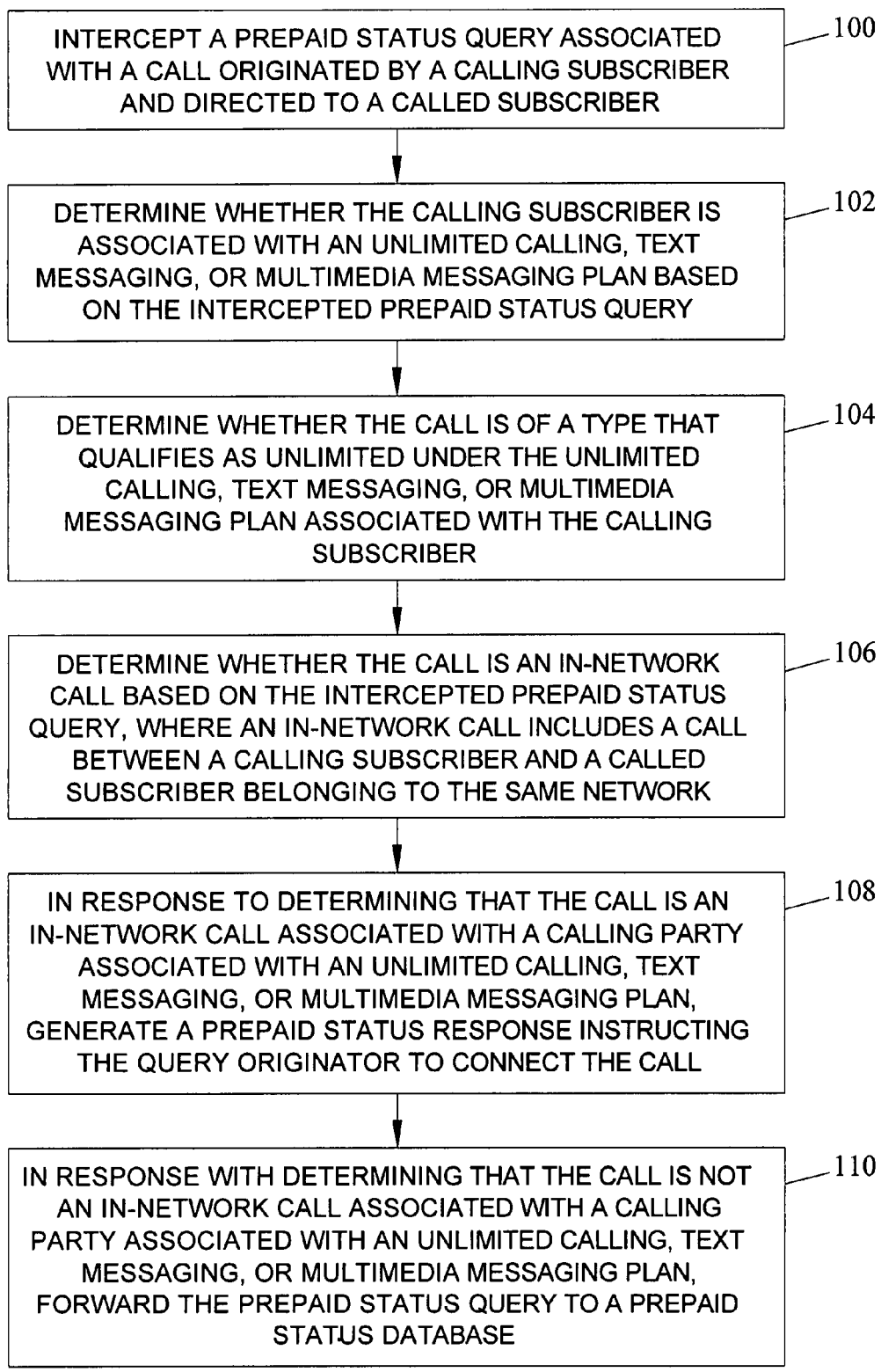
FIG. 1 is a flow chart of a process for offloading prepaid credit status queries from prepaid credit status databases for unlimited-plan prepaid in-network calls according to an embodiment of the subject matter described herein.

FIG. 1 is a flow chart of a process for offloading prepaid credit status queries from prepaid credit status databases for unlimited-plan prepaid in-network calls according to an embodiment of the subject matter described herein. Referring to FIG. 1, in block 100, a prepaid status query is intercepted, where the query is associated with a call originated by a calling subscriber and directed to a called subscriber. For example, a prepaid status query may be generated by a mobile switching center (MSC) or visitor location register (VLR) in response to detecting a call initiated by a calling prepaid mobile subscriber. In one embodiment, the prepaid status query generated may include an intelligent network application part (INAP) initial detection point (IDP) message, or other suitable query mechanism. An INAP IDP query message may be generated, for example, by the query originator in response to receiving an INSERT_SUBSCRIBER_DATA message from a home location register (HLR).

The expected response to the prepaid status query includes an instruction regarding whether to connect the call. This instruction is typically based on an examination of the calling subscriber's prepaid credit status and one or more parameters associated with the call. For example, if, according to the prepaid status database, the calling subscriber does not possess enough credit to place a desired call, the prepaid query response returned to the query originator will include instructions to not connect the call. Alternately, if the calling subscriber does have enough credit to place the desired call, the prepaid query response includes instructions to proceed with connecting the call. However, according to block 100, the prepaid status query may be intercepted by a signaling node located between the MSCNLR and the prepaid status database. In one embodiment, a signal transfer point (STP) may be located between the query originator and the destination prepaid status database and configured to intercept prepaid status queries intended for the prepaid status database. For example, the prepaid status queries may be addressed to the point code of the prepaid status database. In an alternate implementation, the prepaid status queries may be sent route-on-global title, where the STP performs global title translations to determine the address of the prepaid status database.

In block 102, it is determined whether the calling subscriber is associated with an unlimited calling, text messaging, or multimedia messaging plan based on the intercepted prepaid status query. As will be discussed in greater detail below, the determination described in block 102 relates to one of three conditions to be met for prepaid query offloading from a prepaid status database. This determination may be made, for example, by an STP located between the MSCNLR and the prepaid status database, whereby the STP examines parameters included in the intercepted status query. For example, the intercepted prepaid status query may include a ServiceKey parameter indicating a type of calling plan associated with the calling subscriber. In one embodiment, a "24/7 Unlimited Call and Text" plan and a "24/7 Unlimited Text" plan may be identified by a first and a second ServiceKey, respectively. Prepaid mobile calling plans that provide for an unlimited number of calls to be placed during a prepaid period, including voice calls, text message calls, IP multimedia subsystem (IMS) message calls, multimedia message calls, or any combination thereof are hereinafter referred to as "unlimited plans" or "unlimited calling plans." It is appreciated that calling plans other than unlimited calling plans may be identified by ServiceKeys other than the ServiceKeys associated with the unlimited plans described above.

In block 104, it is determined whether the call is an in-network call based on the intercepted prepaid status query. An in-network call includes any call between a calling subscriber and a called subscriber belonging to the same network. As mentioned above, in order for a particular call to qualify as unlimited under an unlimited prepaid calling plan, the call must be an in-network call. Therefore, a determination as to the in-network status of the call is made. In one embodiment, this determination may be made by examining the calling party number and the called party number included in an intercepted prepaid status query. The call may be determined to be an in-network call if both parties belong to the same network. For example, a mobile network may include subscribers identified by a subscriber numbers beginning with 139. In such a network, a call between a first subscriber associated with subscriber number 139-xxx-xxxx and a second subscriber associated with subscriber number 139-xxx-xxxx may be identified as an in-network call. Alternately, a call between a first subscriber with a number beginning with 139 and a second subscriber with a number beginning with 136 may be identified as an out-of-network call.

In block 106, it is determined whether the call is of a type that qualifies as unlimited under the calling plan associated with the calling subscriber. This determination may be made by comparing the TeleService and ServiceKey parameters included in the intercepted prepaid status query. For example, for an intercepted prepaid status query containing TeleService=17 (i.e. a voice call) and ServiceKey="Unlimited Voice and Text Plan", it may be determined that the voice call associated with the query qualifies as unlimited under the calling plan associated with the subscriber because, as indicated by the ServiceKey, voice calls are included in an unlimited voice and text plan. Alternately, for an intercepted prepaid status query containing TeleService=17 (i.e. a voice call) and ServiceKey="Unlimited Text Plan", it may be determined that the voice call associated with the query does not qualify as unlimited under the calling plan associated with the subscriber because, as indicated by the ServiceKey, voice calls are not included in an unlimited text plan.

In block 108, in response to determining that the call is an in-network call associated with a calling party associated with an unlimited calling or text messaging plan, a prepaid status response is generated instructing the query originator to connect the call. The prepaid status response may include, for example, an INAP CONTINUE message instructing the query originator to proceed with connecting the call. For example, for an intercepted query containing TeleService=17 (i.e. a voice call), ServiceKey="Unlimited Voice and Text Plan", calling party ID=139-xxx-xxxx, and called party ID=139-xxx-xxxx, determinations are made that the call associated with the intercepted query is an in-network unlimited prepaid call. Thus, the signaling node intercepting the prepaid status query, such as an STP, may generate a prepaid status response message without forwarding the query to a prepaid status database. By intercepting prepaid status queries and examining various included parameters, the number of prepaid status queries serviced by prepaid status databases is reduced.

In block 110, in response to determining that the call is not an in-network call associated with a calling party associated with an unlimited calling or text messaging plan, the prepaid status query is forwarded to a prepaid status database for processing. As can be appreciated from the scenario described above, for prepaid status queries associated with calls which are not in-network unlimited prepaid calls, prepaid status queries are forwarded to a prepaid status database in order to determine, via conventional methods, whether the calling party possesses enough prepaid credit to place the desired call.

Figure 2:
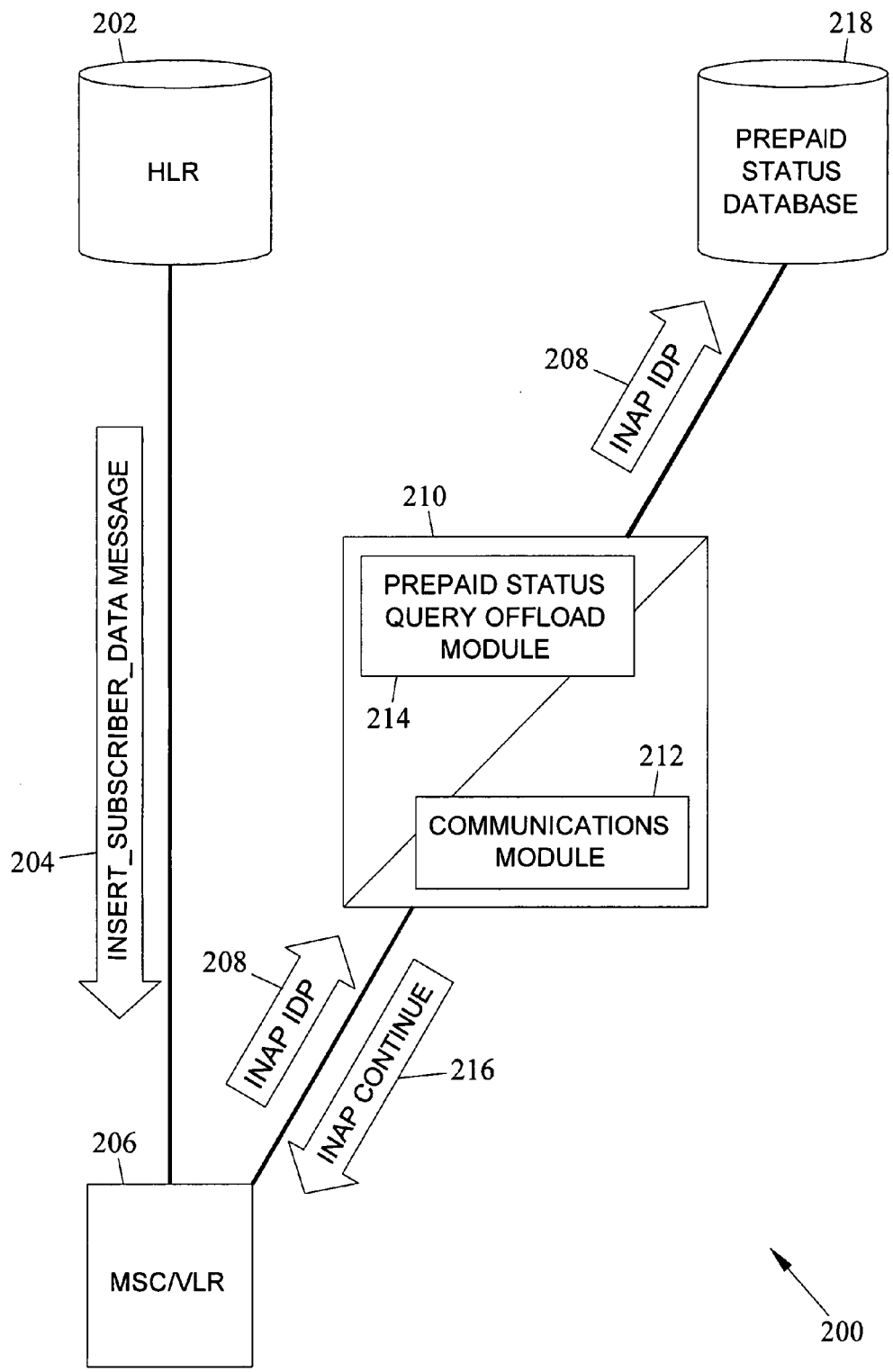
FIG. 2 is a block diagram of a system for offloading prepaid credit status queries from prepaid credit status databases for unlimited-plan prepaid in-network calls according to an embodiment of the subject matter described herein.

FIG. 2 is a block diagram of a system for offloading prepaid credit status queries from prepaid credit status databases for unlimited-plan prepaid in-network calls according to an embodiment of the subject matter described herein. Referring to FIG. 2, system 200 includes a home location register (HLR) 202 for storing information related to mobile phone subscribers. During the process of connecting a call between mobile subscribers, HLR 202 may generate and transmit Insert_Subscriber_Data message 204 to mobile service center (MSC)/visitor location register (VLR) 206. MSCNLR 206 may then generate an intelligent network application part (INAP) initial detection point (IDP) prepaid credit status query 208 destined for an intelligent network (IN) prepaid status database 218.

Prepaid status query 208 may be intercepted by signaling message routing node 210 located between MSCNLR 206 and prepaid status database 220. Node 210 may be, for example, an STP and may contain a communications module 212 for intercepting query 208. Prepaid status query offload module 214 may be configured to determine whether to forward query 208 to prepaid database 218 or to generate INAP response message 216. Exemplary INAP response message 216 may include a CONTINUE message instructing MSCNLR 206 to connect the call. Alternatively, prepaid status query offload module 214 may forward the intercepted query 208 to its intended destination, such as prepaid status database 218.

The determination made by prepaid status query offload module 214 may include examination of various parameters contained in intercepted query 208. The parameters examined by offload module 214 may include a ServiceKey parameter indicating whether the call originated from a prepaid subscriber with an unlimited calling or text messaging plan, such as "24/7 Call and Text Unlimited" or "24/7 Text Unlimited". All other plans may be indicated by different ServiceKeys than those associated with the unlimited prepaid calling plans described above. If the calling subscriber is not associated with an unlimited plan, as indicated by the ServiceKey, query 208 is forwarded to prepaid status database 218 which determines whether to connect the call.

In order to make the determination in block 104, prepaid status query offload module 214 may examine a TeleService parameter included in intercepted query 208 which indicates whether the call is a voice call or a text messaging call. In one embodiment, a decimal value of 17 in the TeleService parameter indicates a voice call. A value equal to 34 indicates a text messaging call, such as a short message service (SMS) mobile-originated/point-to-point (MO/PP) message.

The value of the TeleService parameter included in intercepted query 208 may be compared with the ServiceKey parameter in order to determine whether the call being placed is included in the subscriber's unlimited prepaid calling plan. For example, a subscriber with an unlimited voice prepaid plan initiates a text messaging call to another in-network mobile subscriber. Therefore, query 208 includes a "24/7 Unlimited Voice" ServiceKey and a TeleService value of 17, indicating a voice call. Upon examination of query 208, prepaid status query offload module 214 determines that while the calling subscriber is associated with an unlimited calling plan, the type of call being placed by that subscriber is not included in that plan. Therefore, query 208 is forwarded to its intended destination and prepaid status database 218 is not bypassed.

Prepaid status query offload module 214 may also examine both the calling party number and the called party number included in query 208 for determining whether the call is an in-network call. A call is an in-network call if both the calling party and the called party belong to the same network, as identified by a calling party identifier and a called party identifier included in query 208. Additionally, the calling party identifier and called party identifier may be used to determine the network connecting in-network subscribers. In one embodiment, node 210 may include an in-network subscriber list containing directory number (DN) prefixes and associated subscriber information for subscribers belonging to a particular network, however, it is appreciated that other suitable calling and called party identifiers, such as directory numbers, may be used without departing from the scope of the subject matter described herein. Continuing the exemplary embodiment described above, the calling party identifier and called party identifier included in query 208 may be compared to prefixes located in the in-network database for determining whether a call is in-network. If both the prefix of the Called Party BCDNumber parameter and the prefix of the Calling Party Number are found in the in-network subscriber list, the call is an in-network call. Otherwise, it is an off-network call.

Figure 3:
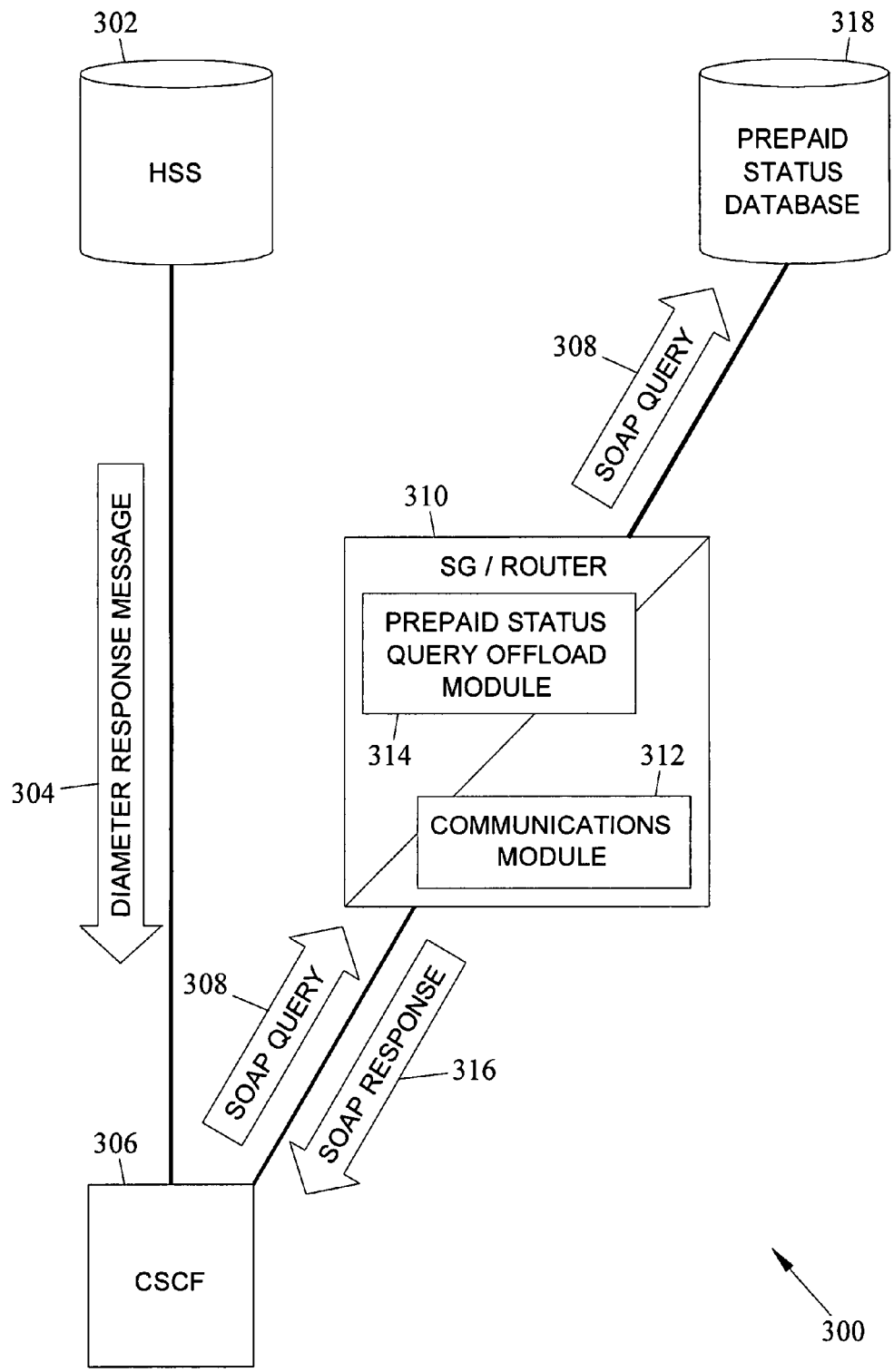
FIG. 3 is a block diagram of a system for offloading prepaid credit status queries from prepaid credit status databases for unlimited-plan prepaid in-network calls in an IP multimedia subsystem (IMS) network according to an embodiment of the subject matter described herein.

In another embodiment, prepaid status queries in an IMS network may be offloaded from a prepaid status database. FIG. 3 is a block diagram of a system for offloading prepaid credit status queries from prepaid credit status databases for unlimited-plan prepaid in-network calls in an IMS network according to an embodiment of the subject matter described herein. Referring to FIG. 3, system 300 includes a home subscriber server (HSS) 302 for storing subscription-related information and location information for IMS entities. During the process of connecting a call between IMS subscribers, in one embodiment, HSS 302 may generate and transmit DIAMETER response message 304 to call session control function (CSCF) 306, where a DIAMETER response message is a message type within the DIAMETER protocol which is related to the remote authentication dial in user service (RADIUS) protocol. CSCF 306 may then generate a simple object access protocol (SOAP) prepaid credit status query 308 destined for prepaid status database 318. It is appreciated that other suitable protocols, such as the customized applications for mobile networks enhanced logic (CAMEL) protocol, may be generated or received by HSS 302 and/or CSCF 306 without departing from the scope of the subject matter described herein.

Prepaid status query 308 may be intercepted by signaling message routing node 310 located between CSCF 306 and prepaid status database 320. As described above, node 310 may be, for example, an STP or IP router and may contain a communications module 312 for intercepting query 308. Prepaid status query offload module 314 may be configured to determine whether to forward query 308 to prepaid database 318 or to generate SOAP response message 316. Exemplary SOAP response message 316 may include a message instructing CSCF 306 to connect the call. Alternatively, prepaid status query offload module 314 may forward the intercepted query 308 to its intended destination, such as prepaid status database 318.

The determination made by prepaid status query offload module 314 may include examination of various parameters contained in intercepted query 308. The parameters examined by offload module 314 may include a first parameter indicating whether the call originated from a prepaid subscriber with an unlimited calling, text messaging, or multimedia messaging plan, such as "24/7 Call and Text Unlimited" or "24/7 Text Unlimited". All other plans may be indicated by different parameters than those associated with the unlimited prepaid calling plans described above. If the calling subscriber is not associated with an unlimited plan, query 308 is forwarded to prepaid status database 318 which determines whether to connect the call.

In order to make the determination in block 104, prepaid status query offload module 314 may examine a second parameter included in intercepted query 308 which indicates whether the call is a voice call, text messaging, or multimedia messaging call. The value of the second parameter included in intercepted query 308 may be compared with the first parameter in order to determine whether the call being placed is included in the subscriber's unlimited prepaid plan. For example, a subscriber with an unlimited voice prepaid plan initiates an IMS call to another in-network mobile subscriber. Therefore, query 308 includes at least a first and second parameter as described above, indicating an IMS call and an unlimited prepaid voice calling plan. Upon examination of query 308, prepaid status query offload module 314 determines that while the calling subscriber is associated with an unlimited calling plan, the type of call being placed by that subscriber is not included in that plan. Therefore, query 308 is forwarded to its intended destination and prepaid status database 318 is not bypassed.

Prepaid status query offload module 314 may also examine a calling party identifier and a called party identifier included in query 308 for determining whether the call is an in-network call. A call is an in-network call if both the calling party and the called party belong to the same network, as identified by a calling party identifier and a called party identifier included in query 308. Additionally, the calling party identifier and called party identifier may be used to determine the network connecting in-network subscribers. In one embodiment, node 310 may include an in-network subscriber list containing directory numbers (DNs), DN prefixes, URIs, domain names, and associated subscriber information for subscribers belonging to a particular network. The calling party identifier and called party identifier included in query 308 may be compared to information located in the in-network database for determining whether a call is in-network. If both the called party identifier and the calling party number are found in the in-network subscriber list, the call is an in-network call. Otherwise, it is an off-network call.

Figure 4:
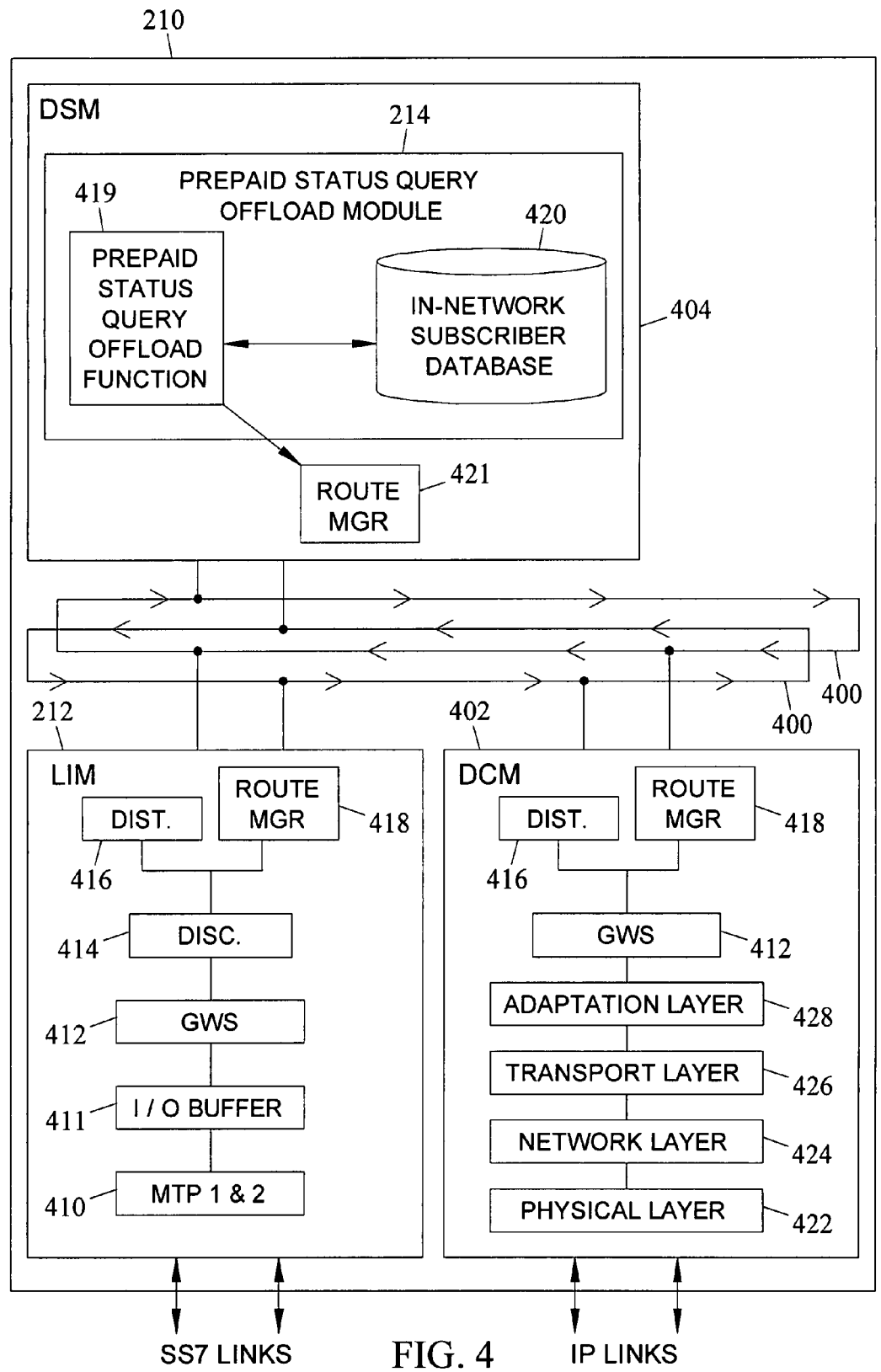
FIG. 4 is a block diagram of an exemplary signaling message routing node for offloading prepaid credit status queries from prepaid credit status databases for unlimited-plan prepaid in-network calls according to an embodiment of the subject matter described herein.

FIG. 4 is a block diagram of an exemplary internal architecture of a signaling message routing node for offloading prepaid credit status queries from a prepaid credit status databases for unlimited-plan prepaid in-network calls according to an embodiment of the subject matter described herein. Referring to FIG. 3, communications module 212 and prepaid status query offload module 214 may be located at a signaling message routing node 210, such as a signal transfer point (STP), and include an internal communications bus 400 that includes two counter-rotating serial rings. A number of processing modules or cards may be coupled to bus 400. In FIG. 6, bus 400 may be coupled to a communications module, such as a link interface module (LIM) 212, a data communications module (DCM) 402, and a database service module (DSM) 404. These modules are physically connected to bus 400 such that signaling and other types of messages may be routed internally between active cards or modules. For simplicity of illustration, only a single LIM, a single DCM, and a single DSM cards are included in FIG. 6. However, signaling message routing node 210 may include multiple other LIMs, DCMs, DSMs, and other cards, all of which may be simultaneously connected to and communicating via bus 400.

Each module 212, 402, and 404 may execute the applications or functions that reside on each module and control communication with other modules via bus 400. For example, DSM 404 may execute software that examines parameters included in a prepaid status query, such as INAP IDP query 208, in order to determine whether to generate a response message or to forward the query to prepaid status database 218.

LIM 212 may include an SS7 MTP level 1 and 2 function 410, an I/O buffer 411, a gateway screening (GWS) function 412, a message discrimination function 414, a message distribution function 416, and a route manager 418. MTP level 1 and 2 function 410 sends and receives digital data over a particular physical interface, provides error detection, error correction, and sequenced delivery of SS7 message packets. I/O buffer 411 provides temporary buffering of incoming and outgoing signaling messages.

GWS function 412 examines received message packets and determines whether the message packets should be allowed into signaling message routing node 210 for processing and/or routing. Discrimination function 414 performs discrimination operations, which may include determining whether the received message packet requires processing by an internal processing subsystem or is simply to be through switched (i.e., routed on to another node in the network). Messages that are permitted to enter signaling message routing node 210, such as INAP IDP prepaid status queries, may be routed to other communications modules in the system or distributed to an application engine or processing module via bus 400.

DSM 214 may receive prepaid status queries from LIM 212 via message distribution function 416. Distribution function 416 located on LIM 212 may forward initial detection point (IDP) queries to DSM 214 via bus 400. Upon receiving an IDP query, prepaid status query offload function 419 may perform a lookup in in-network subscriber database 420 to determine whether the call associated with query 208 is an in-network call. In-network subscriber database 420 may contain information indicating whether a particular subscriber belongs to the network. This information may include, for example, subscriber directory numbers or other subscriber identifiers for each subscriber serviced by a particular network. Additionally, prepaid status query offload function 419 may determine whether a call is included in an unlimited calling plan associated with a particular subscriber, and therefore that a prepaid status database need not be queried. Upon determining that prepaid status database 218 need not be queried in order to connect the call based on information extracted from query 208, a response message is generated and forwarded to DCM 402 via bus 400 and route manager 421.

DCM 402 includes functionality for sending and receiving SS7 messages over IP signaling links. In the illustrated example, DCM 402 includes a physical layer function 422, a network layer function 424, a transport layer function 426, an adaptation layer function 428, and functions 412, 416, and 418 described above with regard to LIM 212. Physical layer function 422 performs open systems interconnect (OSI) physical layer operations, such as transmitting messages over an underlying electrical or optical interface. In one example, physical layer function 422 may be implemented using Ethernet. Network layer function 424 performs operations, such as routing messages to other network nodes. In one implementation, network layer function 424 may implement Internet protocol. The transport layer function 426 implements OSI transport layer operations, such as providing connection oriented transport between network nodes, providing connectionless transport between network nodes, or providing stream oriented transport between network nodes. Transport layer function 426 may be implemented using any suitable transport layer protocol, such as stream control transmission protocol (SCTP), transmission control protocol (TCP), or user datagram protocol (UDP). Adaptation layer function 428 performs operations for sending and receiving SS7 messages over IP transport. Adaptation layer function 428 may be implemented using any suitable IETF or other adaptation layer protocol. Examples of suitable protocols include MTP level 2 peer-to-peer user adaptation layer (M2PA), MTP level 3 user adaptation layer (M3UA), and/or signaling connection control part (SCCP) user adaptation layer (SUA). Functions 412,416, and 418 perform the same operations as the corresponding components described above with regard to LIM 212.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for offloading prepaid status queries for in-network prepaid calls, the method comprising:
at a signaling message routing node:
(a) intercepting a prepaid status query associated with a call originated by a calling subscriber and directed to a called subscriber;
(b) determining whether the calling subscriber is associated with an unlimited calling, text messaging, or multimedia messaging plan based on the intercepted prepaid status query;
(c) determining whether the call is of a type that qualifies as unlimited under the calling, text messaging, or multimedia messaging plan associated with the calling subscriber;
(d) determining whether the call is an in-network call based on the intercepted prepaid status query, where an in-network call includes a call between a calling subscriber and a called subscriber belonging to the same network;
(e) in response to determining that the call is an in-network call associated with a calling party associated with an unlimited calling, text messaging, or multimedia messaging plan, generating a prepaid status response on behalf of a prepaid status database instructing the query originator to connect the call and forwarding the status response to the query originator; and
(f) in response to determining that the call is not an in-network call associated with a calling party associated with an unlimited calling, text messaging, or multimedia messaging plan, forwarding the prepaid status query to the prepaid status database.

2. The method of claim 1 wherein intercepting a prepaid status query includes intercepting an intelligent network application part (INAP) initial detection point (IDP) query.

3. The method of claim 1 wherein intercepting a prepaid status query includes intercepting a simple object access protocol (SOAP) prepaid status query.

4. The method of claim 1 wherein determining whether the calling subscriber is associated with an unlimited calling or text messaging plan includes examining a predefined ServiceKey parameter included in the prepaid status query.

5. The method of claim 4 wherein examining the predefined ServiceKey includes determining whether the ServiceKey is one of "24/7 Call and Text Unlimited", "24/7 Text Unlimited".

6. The method of claim 1 wherein determining whether the call is of a type that qualifies as unlimited under the calling plan associated with the calling subscriber includes examining a TeleService parameter included in the prepaid status query.

7. The method of claim 1 wherein determining whether the call is an in-network call includes examining the calling party number (CgPN) and called party number (CdPN) parameters included in the prepaid status query.

8. The method of claim 1 wherein determining whether the call is an in-network call includes examining the calling party uniform resource identifier (URI) and called party URI parameters included in the prepaid status query.

9. A signaling message routing node for offloading prepaid status queries for in-network prepaid calls, the signaling message routing node comprising:
(a) a communications module for intercepting a prepaid status query associated with a call originated by a calling subscriber and directed to a called subscriber; and
(b) a prepaid status query offload module for:
(i) determining whether the calling subscriber is associated with an unlimited calling, text messaging, or multimedia messaging plan based on the intercepted prepaid status query;
(ii) determining whether the call is an in-network call based on the intercepted prepaid status query, where an in-network call includes a call between a calling subscriber and a called subscriber belonging to the same network;
(iii) in response to determining that the call is an in-network call associated with a calling party associated with an unlimited calling, text messaging, or multimedia messaging plan, generating a prepaid status response instructing the query originator to connect the call; and
(iv) in response to determining that the call is not an in-network call associated with a calling party associated with an unlimited calling, text messaging, or multimedia messaging plan, forwarding the prepaid status query to the prepaid status database.

10. The signaling message routing node of claim 9 wherein intercepting a prepaid status query includes intercepting an intelligent network application part (INAP) initial detection point (IDP) query.

11. The signaling message routing node of claim 9 wherein intercepting a prepaid status query includes intercepting an simple object access protocol (SOAP) prepaid status query.

12. The signaling message routing node of claim 9 wherein determining whether the calling subscriber is associated with an unlimited calling, text messaging, or multimedia messaging plan includes examining a predefined ServiceKey parameter included in the prepaid status query.

13. The signaling message routing node of claim 11 wherein examining the predefined ServiceKey includes determining whether the ServiceKey is one of "24/7 Call and Text Unlimited", "24/7 Text Unlimited".

14. The signaling message routing node of claim 9 wherein determining whether the call is of a type that qualifies as unlimited under the calling plan associated with the calling subscriber includes examining a TeleService parameter included in the prepaid status query.

15. The signaling message routing node of claim 9 wherein determining whether the call is an in-network call includes examining the calling party number (CgPN) and called party number (CdPN) parameters included in the prepaid status query.

16. The signaling message routing node of claim 9 wherein determining whether the call is an in-network call includes examining the calling party uniform resource identifier (URI) and called party URI parameters included in the prepaid status query.

17. A computer program product comprising computer executable instructions embodied in a computer readable medium for performing steps comprising:
  (a) intercepting a prepaid status query associated with a call originated by a calling subscriber and directed to a called subscriber;
  (b) determining whether the calling subscriber is associated with an unlimited calling, text messaging, or multimedia messaging plan based on the intercepted prepaid status query;
  (c) determining whether the call is an in-network call based on the intercepted prepaid status query, where an in-network call includes a call between a calling subscriber and a called subscriber belonging to the same network;
  (d) in response to determining that the call is an in-network call associated with a calling party associated with an unlimited calling, text messaging, or multimedia messaging plan, generating a prepaid status response instructing the query originator to connect the call; and
  (e) in response to determining that the call is not an in-network call associated with a calling party associated with an unlimited calling, text messaging, or multimedia messaging plan, forwarding the prepaid status query to a prepaid status database.

\* \* \* \* \*